United States Patent
Akieda et al.

(10) Patent No.: US 8,153,270 B2
(45) Date of Patent: Apr. 10, 2012

(54) DECORATIVE CASING AND MANUFACTURING METHOD THEREOF

(75) Inventors: Shinichiro Akieda, Shinagawa (JP); Takashi Yuba, Shinagawa (JP); Takashi Arita, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 487 days.

(21) Appl. No.: 12/222,663

(22) Filed: Aug. 13, 2008

(65) Prior Publication Data

US 2009/0068404 A1    Mar. 12, 2009

(30) Foreign Application Priority Data

Sep. 7, 2007  (JP) ................. 2007-233160

(51) Int. Cl.
*B32B 33/00*  (2006.01)
*B32B 3/00*   (2006.01)
*H04B 1/034*  (2006.01)

(52) U.S. Cl. .............. 428/542.2; 428/43.1; 428/172; 428/203; 428/207; 428/209; 428/210; 428/354; 428/913.3; 455/90.3; 455/128; 455/575.1; 455/575.8

(58) Field of Classification Search ............ 428/156, 428/172, 43.1, 203, 207, 209, 210, 354, 690, 428/542.2, 913.3; 206/320; 476/201–206; 455/90.3, 128, 575.1, 575.8; 473/201–206
See application file for complete search history.

(56) References Cited

U.S. PATENT DOCUMENTS

| 7,160,611 | B2* | 1/2007 | Banba et al. ............... 428/343 |
| 2006/0169608 | A1* | 8/2006 | Carnevali ................. 206/320 |

FOREIGN PATENT DOCUMENTS

JP   2006-224324   8/2006

* cited by examiner

*Primary Examiner* — Donald J Loney
(74) *Attorney, Agent, or Firm* — Staas & Halsey LLP

(57) ABSTRACT

The invention concerns a decorative casing fabricated by bonding a film having a polarizing characteristic to the surface of the casing body via an adhesive layer, and an object of the invention is to provide the casing with enhanced decorativeness by designing the adhesive layer so as to render various color effects in addition to the effect rendered by the polarizing characteristic. The polarizing film is bonded to the surface of the casing body via the adhesive layer containing a special-effect material having a color effect. According to the present invention, by directly bonding the polarizing film to the casing via the adhesive layer that produces a desired color effect, other effects such as color hue can be conferred in the film bonding step, and thus a casing having an excellent decorative effect can be manufactured by a simple process without increasing the number of process steps.

31 Claims, 7 Drawing Sheets

(a)

(b)

(a)

(b)

(c)

(a)

(b)

(c)

(d)

(a)

(b)

(c)

(d)

(a)

(b)

(c)

(d)

(a)

(b)

(c)

DECORATIVE CASING AND MANUFACTURING METHOD THEREOF

CROSS REFERENCE TO RELATED DOCUMENT

This application is a new U.S. Patent Application that claims the benefit of Japanese Patent Application No. 2007-233160 filed on Sep. 7, 2007, the entire content of the Japanese Patent Application No. 2007-233160 is hereby incorporated by reference.

BACKGROUND OF THE INVENTION

1. Field of the Invention

The present invention relates to a technique for decorating a casing by bonding a film to the surface of the casing via an adhesive layer. More specifically, the invention relates to a decoration technique for enhancing the decorativeness of the casing by adding a special-effect material to the adhesive layer by which the film having a polarizing characteristic is bonded to the casing.

2. Description of the Related Art

It has been known in recent years to provide a technique for enhancing the decorativeness of electronic equipment, such as a mobile phone, by laminating a decorative film of a polyethylene terephthalate (PET) resin to the surface of the casing of the electronic equipment. The color of the casing of electronic equipment is an important factor from the viewpoint of decorativeness, and it is important that the color be chosen to match user preferences. When laminating such a decorative film to the casing, the desired color hue is rendered by coloring the decorative film or the casing itself.

On the other hand, a technique for coloring the adhesive layer of the decorative film, rather than coloring the decorative film itself, has been proposed (for example, refer to Japanese Unexamined Patent Publication No. 2006-224324). FIG. 8 shows a cross-sectional structure of an automotive film disclosed in that patent publication. A colored adhesive layer 30 is provided between a base film 11 and a decorative PET film 20. A surface coating layer 40 made of a synthetic resin containing a UV-blocking agent and a protective film layer 60 are formed on top of the decorative PET film 20.

The colored adhesive layer 30 is formed by mixing a pigment, dye, coloring agent, or the like into a synthetic resin, such as an urethane resin or an acrylic resin. This color combines with the color of the underlying base film 11 to produce the desired color. Since the colors of the two layers are seen through the decorative PET film 20, a color of greater depth can be rendered.

However, in the prior art, a multilayer film is formed by forming on top of the base film the decorative PET film provided with a decorative effect. When applying this film to electronic equipment or the like, the manufacturing process requires an additional step for attaching the base film to the electronic equipment or the like. This has led to the problem that the number of process steps for decoration increases. Furthermore, in the prior art, the colored adhesive layer is formed by simply mixing a pigment or the like, and it is only possible to obtain the decorative effect produced by the coloring. Since other special effects such as color hue cannot be rendered, there has been a limit to how well the color can be rendered.

Accordingly, it is an object of the present invention to provide a casing having enhanced decorativeness by bonding a film having a polarizing characteristic to the casing via an adhesive layer, and by designing the adhesive layer so as to render various special effects.

SUMMARY OF THE INVENTION

A decorative casing according to the present invention includes a film bonded to a surface of a casing body of the decorative casing via an adhesive layer, wherein the film is provided with a polarizing characteristic, and a special-effect material is added to the adhesive layer. Preferably, the special-effect material is a paint, and more preferably, the paint is formed from either an acrylic-based pigment or an urethane-based pigment, or both. The special-effect material may be a fluorescent paint or a luminous paint.

The special-effect material may contain single or multiple color paints, and a marble pattern may be formed on the surface of the casing body.

The special-effect material may contain fine optical reflectors. Preferably, the optical reflectors are formed from metal. More preferably, the metal includes at least one substance selected from the group consisting of silver, aluminum, and stainless steel. The optical reflectors may be formed from glass.

The special-effect material may contain fine carbon particles or carbon fiber.

The special-effect material may contain a laser-reactive substance which reacts to laser radiation. Preferably, the laser-reactive substance is either an epoxy-based photo-hardening resin or an oxetane-based photo-hardening resin.

The special-effect material may contain a heat dissipating fine material having high thermal conductivity. Preferably, the heat dissipating material contains metal particles or metal flakes, or a structure formed from carbon.

The special-effect material may contain fine bubbles. Preferably, the fine bubbles are formed by foaming azodicarbonamide.

The special-effect material may contain an elastic fine material.

The adhesive layer may have a selectively varying thickness with respect to the surface of the casing body. The surface of the casing body may be formed with projections and depressions.

The adhesive layer may comprise at least two kinds of special-effect materials.

The surface of the casing body to which the film is bonded may be flat, while a casing surface opposite from the surface of the casing body may contain projections and depressions.

The casing body may be formed from a resin or metal. Preferably, the metal includes at least one substance selected from the group consisting of stainless steel, aluminum, titanium, silver, magnesium, and an alloy thereof.

The casing body may be formed from glass or from a structure made of carbon.

Preferably, the film is formed by laminating together a plurality of films having different refractive indexes.

The special-effect material may form at least one of a decorative pattern, a letter and a symbol on the surface of the casing body.

A colorless or colored transparent or semi-transparent cover layer may be formed on a surface of the film.

A method for manufacturing a decorative casing according to the present invention, comprises: a step for bonding a film having a polarizing characteristic to a surface of a casing body; forming an adhesive layer on one surface of the film by using an adhesive containing a special-effect material; and compression-bonding the film to the surface of the casing body via the adhesive layer.

Preferably, the special-effect material comprises one or more materials selected from the group consisting of a paint, a fluorescent paint, a luminous paint, an optically reflective fine substance, a heat dissipating fine material having high thermal conductivity, a fine bubble material, and an elastic fine material.

Preferably, the special-effect material is dispersed unevenly in the adhesive.

Preferably, in the adhesive layer forming step, the special-effect material forms the adhesive layer to form at least one of a decorative pattern, a letter and a symbol.

The method for manufacturing the decorative casing according to the present invention includes the steps of: forming the adhesive layer on the film by using the adhesive containing the special-effect material which contains a laser-reactive substance that reacts to laser radiation; boding the film to the surface of the casing body via the adhesive layer; and applying a laser to the adhesive layer.

Preferably, the film is formed by laminating together a plurality of films having different refractive indexes.

Preferably, in the film compression-bonding step, the film is heated and pressed by a pressing jig having a shape that matches the surface shape of the casing body, and the film is thus bonded to the surface of the casing body via the adhesive layer.

Preferably, the film compression-bonding step includes the steps of: placing the film with the adhesive layer formed thereon onto a mold having a recess of a prescribed shape, and thereby forming the film into the shape of the recess; and placing an injection molding die on the mold by interposing the film therebetween, and forming a thermoplastic casing by injecting a thermoplastic resin into a recess formed by the film.

Preferably, the film compression-bonding step includes the step of placing the film on the mold and forming the film into the shape of the recess by pressing the film onto the recess or by evacuating air from the recess.

Preferably, the film compression-bonding step includes the step of forming the adhesive layer on the surface of the film after the surface has been treated for enhanced adhesion.

Preferably, the film compression-bonding step includes the step of forming a colorless, colored transparent or semi-transparent cover layer on a surface of the film.

According to the present invention, a decorative casing is obtained to which a film having a polarizing characteristic is bonded via an adhesive layer that produces a desired special effect. Accordingly, using a process of bonding the film to the casing, color hue and other special effect can be added. Furthermore, a casing having an excellent decorative effect can be obtained without increasing the number of process steps for decoration. Further, with the color of the casing itself combined with the interference color produced by the multilayer film, coupled with the color hue, etc. provided by the adhesive layer, a variety of excellent decorative effects can be achieved.

BRIEF DESCRIPTION OF THE DRAWINGS

These and other features and advantages of the present invention will be better understood by reading the following detailed description, taken together with the drawings wherein.

DESCRIPTION OF THE PREFERRED EMBODIMENTS

Various embodiments of the decorative casing of the present invention and the manufacturing method thereof will be described below with reference to FIGS. 1 to 7. FIGS. 1 to 7 each show a cross-sectional view of the decorative casing of the preset invention, revealing a portion of the decorative casing. The structures shown in these figures are identical in that a film 3 having a polarizing characteristic is bonded to the surface of the body of the casing 1 via an adhesive layer 2. A transparent multilayer film having an interference characteristic is used as the polarizing film.

In each figure, the cross-sectional view of the decorative casing is shown in schematic form for convenience of explanation, and the ratio of the thicknesses of the casing 1, the adhesive layer 2, and the multilayer film 3 shown here are different from the actual ratio. The casing 1 may be formed from a resin, in particular, a thermoplastic resin, or metal.

The present invention is characterized in that a special-effect material is added to the adhesive layer 2. By suitably choosing this special-effect material, the desired decorative effect can be provided to the casing. Embodiments of the decorative casing produced by varying the special-effect material to be added to the adhesive layer will be described in detail below.

(1st Embodiment)

Figure 1:
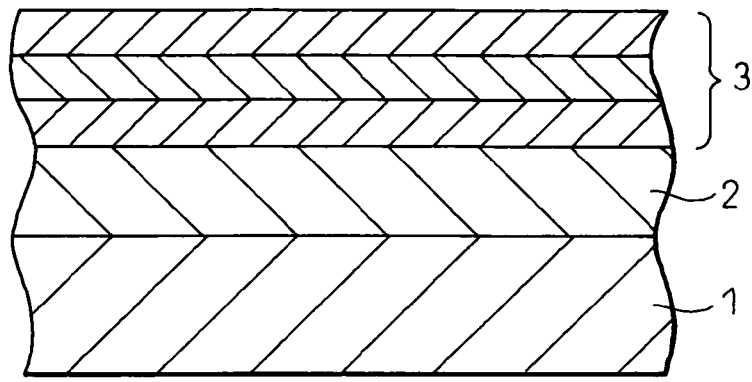
FIG. 1 is a cross-sectional view of a decorative casing according to the present invention.
Figure 2:
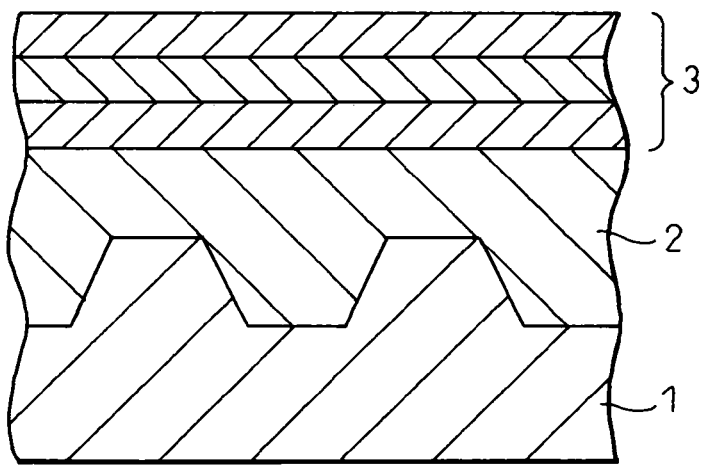
FIG. 2 is a cross-sectional view of a decorative casing according to a 10th embodiment of the present invention.
Figure 2:
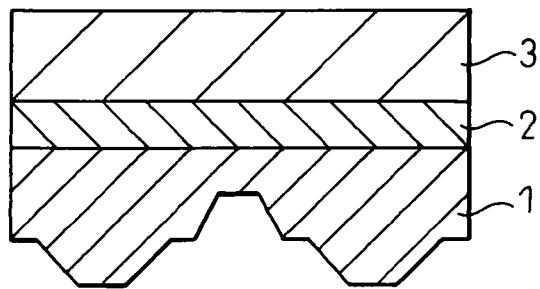

FIG. 1 shows the decorative casing according to a first embodiment of the present invention. As shown in FIG. 1, the multilayer film 3 having an interference characteristic is bonded to the surface of the body of the casing 1 via the adhesive layer 2. The adhesive layer 2 is formed from an acrylic- or urethane-based resin, and a paint for providing a coloring effect is added as the special-effect material. Preferably, the adhesive layer remains solidified at room temperature, but melts when heated. More preferably, the paint is formed from either an acrylic-based pigment or an urethane-based pigment, or both. In FIG. 1, the multilayer film 3 is shown as comprising three layers, but actually, at least two kinds of thin films having different refractive indexes are formed one on top of another in hundreds of layers. The multilayer film 3 produces an interference color whose hue changes according to a viewing angle. With this structure, highly expressive color hues can be achieved with the interference color of the film 3 superimposed on the base color of the casing 1 and the color of the adhesive layer 2 added to it.

Next, the manufacturing method of the decorative casing according to the first embodiment will be described. First, an adhesive with a paint added therein is applied over the multilayer film 3 by a known method such as die coating. To provide flowability, the adhesive is prepared by dissolving it in an organic solvent and diluting it to a solution of about 10%. The adhesive is applied to a thickness of about 100 μm. After the adhesive is applied, the organic solvent is evaporated by heating, thus producing the adhesive layer 2 about 10 μm in thickness. Next, the multilayer film 3 with the adhesive layer 2 facing down is placed on the surface of the casing 1 and is bonded to the casing 1 by applying heat and pressure.

(2nd Embodiment)

Next, a second embodiment according to the present invention will be described. In the second embodiment, the structure of the decorative casing is fundamentally the same as that shown in FIG. 1, but the difference from the first embodiment is that a fluorescent paint is mixed into the adhesive layer 2. The fluorescent paint here can be mixed into the adhesive layer 2 by first adding a powdered fluorescent pigment to an adhesive such as used in the first embodiment and then applying it using a method such as die coating.

By mixing the fluorescent paint into the adhesive layer 2, the fluorescent effect can be added to the color effects rendered by the base color of the casing 1 and the interference color of the multilayer film 3. As a result, nonconventional highly expressive color hues can be achieved.

Instead of the fluorescent paint, a luminous paint may be used. An inorganic pigment of alumina-based oxides is preferred for the luminous material. By mixing the luminous paint into the adhesive layer 2, the luminous effect can be added to the color effects rendered by the base color of the casing 1 and the interference color of the multilayer film 3.

(3rd Embodiment)

Next, a third embodiment will be described. In the third embodiment, the structure of the decorative casing is fundamentally the same as that shown in FIG. 1, but the difference is that single color or multiple color paints are added to the adhesive layer 2 to form a marble pattern on the surface of the casing body. More specifically, in the step of forming the adhesive layer by a die coater, a plurality of coloring agents are added to the adhesive dissolved in an organic solvent, and the adhesive is applied over the multilayer film 3 without thoroughly mixing the coloring agents into the solution but by leaving them unevenly dispersed in the solution.

Since the paints are unevenly distributed in the thus applied adhesive, after removal of the organic solvent the paints are unevenly distributed in the adhesive layer 2, resulting in the formation of a so-called marble pattern. This achieves highly expressive color effects with the uneven coloring of the adhesive layer 2 superimposed on the color of the casing 1 in addition to the interference color of the multilayer film 3.

(4th Embodiment)

Next, a fourth embodiment will be described. In the fourth embodiment, the structure of the decorative casing is fundamentally the same as that shown in FIG. 1, but the difference is that fine optical reflectors producing special effects are mixed into the adhesive layer 2. Metal or glass is a preferred material for the optical reflectors. In the case of metal, silver, aluminum, or stainless steel is more preferable. The optical reflectors here can be mixed into the adhesive layer 2 by first adding metallic flakes or glass flakes to an adhesive dissolved in an organic solvent, such as used in the first embodiment, and then applying it using a method such as die coating.

By mixing the optical reflectors according to the fourth embodiment into the adhesive layer 2, a random scattering light effect can be obtained, and highly expressive color hues can be achieved with the reflected light from the optical reflectors contained in the adhesive layer 2 serving to enhance the color effects rendered by the base color of the casing 1 and the interference color of the multilayer film 3.

(5th Embodiment)

Next, a fifth embodiment will be described. In the fifth embodiment, the structure of the decorative casing is fundamentally the same as that shown in FIG. 1, but the difference is that a low-reflectance substance, for example, a light-absorbing substance, is mixed into the adhesive layer 2. Carbon particles or carbon fiber are preferred for the low-reflectance substance. The low-reflectance substance can be mixed into the adhesive layer 2 by first adding the carbon particles or the like to an adhesive dissolved in an organic solvent, such as used in the first embodiment, and then applying it using a method such as die coating.

In the fifth embodiment, by mixing the low-reflectance substance into the adhesive layer 2, a color hue with reduced light reflectance can be obtained in addition to the color effects rendered by the base color of the casing 1 and the interference color of the multilayer film 3; this is effective in producing a subdued color tone, contrary to the case of the fourth embodiment.

(6th Embodiment)

Next, a sixth embodiment will be described. In the sixth embodiment, the structure of the decorative casing is fundamentally the same as that shown in FIG. 1, but the difference is that a laser-reactive substance that reacts to laser radiation is mixed into the adhesive layer 2. The laser-reactive substance can be mixed into the adhesive layer 2 by first adding the laser-reactive substance to an adhesive dissolved in an organic solvent, such as used in the first embodiment, and then applying it using a method such as die coating.

After the adhesive layer 2 is formed, or after the multilayer film 3 is bonded to the casing 1 via the adhesive layer 2, a laser is applied to the adhesive layer 2 containing the laser-reactive substance. As a result, light reflecting characteristics change only in regions where the laser was applied, and thus a laser engraved seal or symbol can be formed in a desired pattern. An epoxy-based photo-hardening resin or an oxetane-based photo-hardening resin is preferably used as the laser-reactive substance. In the former case, the laser to be applied is preferably a solid-state laser (YAG, ruby, etc.), and in the latter case, a He—Cd laser is preferable.

According to the sixth embodiment, there is offered, in addition to the color effects rendered by the base color of the casing 1 and the interference color of the multilayer film 3, the effect that a region where light is transmitted or refracted differently than in other regions can be formed in a desired pattern.

(7th Embodiment)

Next, a seventh embodiment will be described. In the seventh embodiment, the structure of the decorative casing is fundamentally the same as that shown in FIG. 1, but the difference is that the adhesive layer 2 is provided with high thermal conductivity. In other words, the thermal conductivity of a generally used adhesive layer is low, which causes the problem that the heat generated inside the casing is difficult to dissipate. In view of this, a heat dissipating fine material having high thermal conductivity is added to provide a heat dissipating effect to the adhesive layer 2. A material having high thermal conductivity, such as metallic particles, metallic flakes, or a structure formed from carbon, is preferred for the heat dissipating material.

Adding such a heat dissipating effect is particularly advantageous when the thickness of the adhesive layer is increased by adding a coloring agent to the adhesive layer shown in any one of the first to sixth embodiments in order to fully achieve its color effects.

By providing such a heat dissipating effect to the adhesive layer, heat can be dissipated while fully achieving the color effects rendered by the color of the adhesive layer 2 in combination with the base color of the casing 1 and the interference color of the multilayer film 3.

(8th Embodiment)

Next, an eighth embodiment will be described. In the eighth embodiment, the structure of the decorative casing is fundamentally the same as that shown in FIG. 1, but the difference is that the adhesive layer 2 contains fine bubbles. In other words, generally, the presence of bubbles is undesirable when forming a coating film, but the eight embodiment actively utilizes the bubbles as part of the color effects.

If bubbles in an amount sufficient for use as part of the color effects are to be formed by stirring only, it may take a long time. Therefore, in the eighth embodiment, to actively utilize the bubbles as part of the color effects, a foaming agent is added so that a prescribed amount of bubbles can be formed in an extremely short time in a controlled manner. Azodicarbonamide is preferred for the foaming agent added to form fine bubbles.

(9th Embodiment)

Next, a ninth embodiment will be described. In the ninth embodiment, the structure of the decorative casing is fundamentally the same as that shown in FIG. 1, but the difference is that the adhesive layer 2 contains an elastic fine material in order to reduce impact made to the inside of the casing. By thus adding the elastic material, the structure serves to protect the casing from impact, while at the same time, achieving highly expressive color hues by the base color of the casing 1 and the interference color of the multilayer film 3 coupled with the color produced by the coloring agent added to the adhesive layer 2 as shown in the first to sixth embodiments. Further, when the elastic material itself is a colored material, the color of the elastic material also contributes to further enhancing the color expressiveness.

(10th Embodiment)

Next, a 10th embodiment will be described. In the embodiments so far described, the adhesive layer 2 is formed to a uniform thickness, but in the 10th embodiment, the thickness of the adhesive layer containing a coloring agent is varied thereby varying the color effect from one region to the next on the surface of the casing body.

A decoration example of the decorative casing according to the 10th embodiment is shown in FIG. 2(a). In the example shown in FIG. 2(a), the surface of the casing 1 is formed with projections and depressions, thus varying the thickness of the adhesive layer 2 from region to region. If a paint or like material having a coloring effect is uniformly dispersed through the adhesive layer 2, the color effect can be enhanced with the amount of the coloring material increasing in thick regions of the adhesive layer compared with thin regions.

By thus varying the thickness of the adhesive layer in a selective manner, the color effect can be modulated to produce a well-defined color effect. In FIG. 2(a), the thickness of the adhesive layer is varied between two values, but it may be varied between three or more values or may be varied continuously. Further, in the example shown in FIG. 2(a), the surface of the casing 1 is formed with projections and depressions. On the other hand, the thickness of the adhesive layer 2 formed on the multilayer film 3 may be randomly varied while keeping the surface of the casing 1 flat; in this case also, the color effect can be modulated.

In the adhesive layer used in each of the above embodiments, the various special-effect materials used in the respective embodiments may be used singly or in any combination thereof. For example, a fluorescent material producing a fluorescent color and optical reflectors may be mixed together and added to the adhesive layer 2. Such a structure offers the effect that a plurality of effects can be simultaneously achieved with a single adhesive layer.

Further, the adhesive layers containing the additives shown in the respective embodiments may be formed in a multilayered structure. For example, the following structure is possible. First, a first adhesive layer to which a fluorescent material producing a fluorescent color has been added is formed on the surface of the casing, and a first multilayer film is bonded to it. On top of this structure, a second multilayer film is formed by interposing a second adhesive layer to which a high-reflectance material for providing a high-reflectance characteristic has been added.

Such a structure offers the effect that the color hue can be controlled accurately, since the layer thickness and the concentration of the additive can be adjusted as desired for each layer.

Each of the above embodiments has shown an example that uses the multilayer film, but a decorative PET film having a different color effect may be used.

(11th Embodiment)

Next, an 11th embodiment will be described. The 11th embodiment is a modification of the 10th embodiment. As shown in FIG. 2(b), the surface of the casing body to which the multilayer film 3 is bonded is flat, but the casing surface on the reverse side of the casing body is formed with projections and depressions. Projections and depressions are often formed on the casing body itself in order to accommodate electronic equipment or to increase the rigidity of the casing body, but keeping the casing surface flat has the effect of being able to maintain the decorative appearance.

In each of the above embodiments, the decorative casing itself is preferably formed from a resin, in particular, a thermoplastic resin. When a resin is used, the casing can be injection molded, and is therefore easy to manufacture. Furthermore, since the resin can be easily colored, an intricate color hue can be easily obtained.

Alternatively, the decorative casing itself may be formed from metal. When it is formed from metal, the thickness of the casing can be reduced while maintaining its rigidity. As a result, the size and thickness of the decorative casing can be reduced to match the size of the electronic equipment to be accommodated therein. Furthermore, a unique color hue can be produced by utilizing the luster unique to the metal. Stainless steel, aluminum, titanium, silver, magnesium, or alloys thereof are preferred for the metal material.

Alternatively, the decorative casing itself may be formed from glass. When it is formed from glass, a special decorative effect having transparency can be achieved.

Further, the decorative casing may be formed from a structure made of carbon. When it is formed from a carbon structure, the weight of the casing can be reduced while maintaining its rigidity.

The multilayer film used in each of the above embodiments can be formed by laminating together a plurality of films having different refractive indexes. For example, when two kinds of PET films having different refractive indexes are formed one on top of another in hundreds of layers, the so-called iridescent color can be produced with the interference color changing according to a viewing angle.

Further, the special-effect material may be used to form either a decorative pattern or a letter or symbol, or both, on the surface of the casing. For example, a decorative pattern can be formed to make a marble pattern, while on the other hand, a letter or symbol can be formed by applying a laser to the laser-reactive substance in a desired shape. If these two materials are included in the adhesive layer, the decorative effect due to the marble pattern and the laser engraving of the letter or symbol can be accomplished at the same time.

Furthermore, a colorless, colored transparent or semi-transparent cover layer may be formed on the surface of the multilayer film. By forming such a cover layer, abrasion and corrosion resistant characteristics can be conferred on the multilayer film 3. When a colorless transparent layer is used as a cover layer, the original color hue can be maintained, while when a colored or semi-transparent layer is used as a cover layer, an additional hue can be provided.

The first to 11th embodiments have been described above by focusing on the structure of the decorative casing according to the present invention. Next, the manufacturing method of the decorative casing according to the present invention will be described with reference to 12th to 16th embodiments.

(12th Embodiment)

Figure 3:
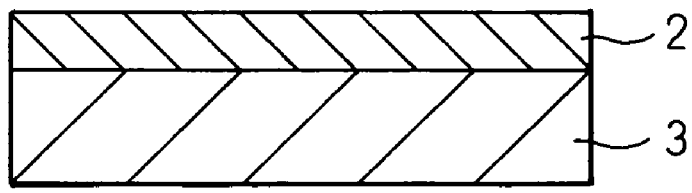
FIG. 3 is a process flow diagram illustrating a manufacturing method of a decorative casing according to a 12th embodiment of the present invention.
Figure 3:
Figure 3:
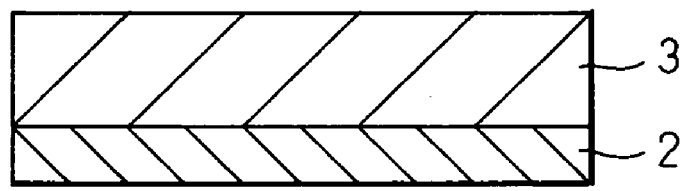
Figure 3:
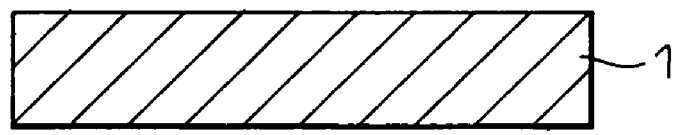
Figure 3:
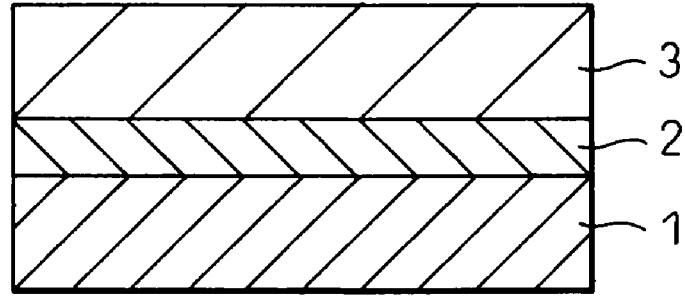

The manufacturing method of the decorative casing according to the present invention will be described below. FIG. 3 shows a process flow diagram illustrating the manufacturing method of the decorative casing according to the 12th embodiment. This embodiment is shown by taking as an example the decorative casing shown in FIG. 1, and is characterized in that the multilayer film is bonded to one of the two surfaces of the casing via the adhesive layer.

First, as shown in FIG. 3(a), the adhesive containing a special-effect material and dissolved in an organic solvent is applied over the multilayer film 3 by using a method such as die coating. Next, the thus applied material is dried and the organic solvent removed, thus forming the adhesive layer 2 (adhesive layer forming step). Next, as shown in FIG. 3(b), the casing 1 fabricated in a separate process step is placed with its surface facing the surface of the multilayer film 3 on which the adhesive layer 2 has been formed.

Then, the casing 1 and the multilayer film 3 are pressed together under heat by applying a pressure plate 5 from the side of the multilayer film 3 opposite the side on which the adhesive layer 2 is formed (film compression-bonding step). The heat may be applied by heating the pressure plate 5. By applying the pressure while heating, the adhesive in the adhesive layer melts and the adhesive layer 2 is made to adhere to the casing 1. Next, as shown in FIG. 3(c), after the casing 1 is cooled, the pressure plate 5 is removed, completing the fabrication of the casing 1 with the multilayer film 3 bonded to the surface thereof.

With this manufacturing method, the pressure can be applied evenly within the predefined plane, and the adhesive layer 2 can thus be bonded evenly over the entire surface of the casing in the multilayer film bonding step. As a result, the adhesive layer containing the special-effect material can be formed to a uniform thickness, and the special effects produced by the adhesive layer 2 can be equalized within the plane.

Preferably, the special-effect material comprises one or more materials selected from the group consisting of a paint, a fluorescent paint, a luminous paint, an optically reflective fine substance, a heat dissipating fine material having high thermal conductivity, a fine bubble material, and an elastic fine material. When any of these special-effect materials is used singly, the effect that the selected special-effect material has can be utilized singly, but when they are used in a suitable combination, the special effects that the respective materials have can be achieved simultaneously. As a result, novel color effects that were not possible with the prior art can be achieved.

Further, any of the above special-effect materials may be dispersed unevenly in the adhesive layer. For example, when adding a plurality of dyes to the adhesive layer, by dispersing them unevenly a unique pattern such as a marble pattern can be formed. More specifically, a plurality of dyes are added to the adhesive, and without thoroughly mixing them, the adhesive is applied over the multilayer film 3 by a die coater, to obtain an unevenly distributed pattern.

(13th Embodiment)

Figure 4:
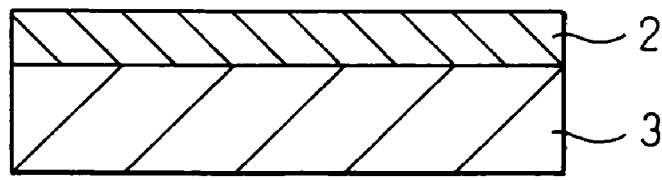
FIG. 4 is a process flow diagram illustrating a manufacturing method of a decorative casing according to a 13th embodiment of the present invention.
Figure 4:
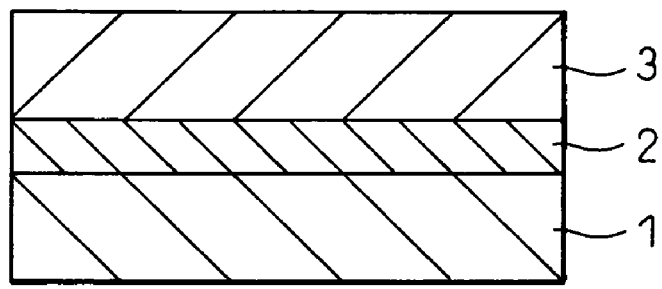
Figure 4:
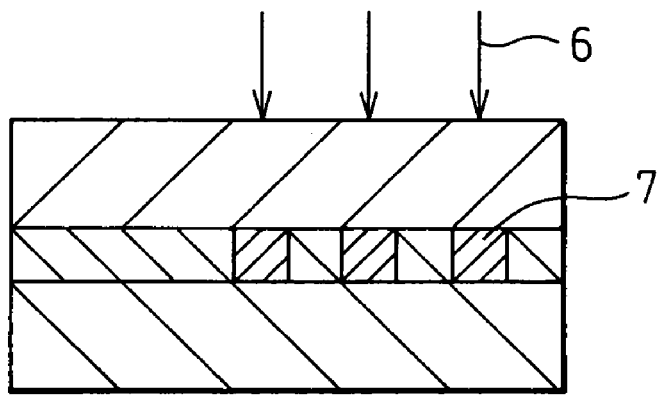
Figure 4:
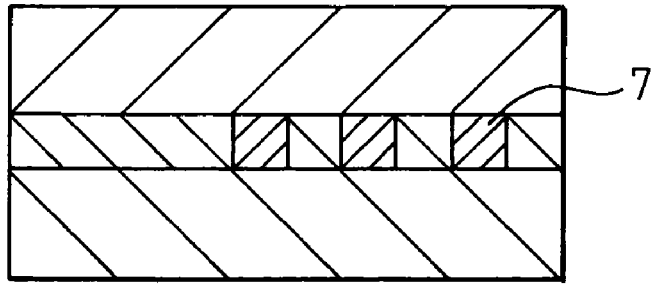

Next, another manufacturing method of the decorative casing according to the present invention will be described. FIG. 4 shows a process flow diagram illustrating the manufacturing method of the decorative casing according to the 13th embodiment. In this embodiment, the laser-reactive substance is added to the adhesive layer 2, and a laser is applied to it, to obtain a special effect.

First, as shown in FIG. 4(a), the adhesive layer 3 containing the laser-reactive substance is formed over the multilayer film 3 by using a method such as die coating. An epoxy-based photo-hardening resin or an oxetane-based photo-hardening resin is preferably used as the laser-reactive substance. Next, as shown in FIG. 4(b), the adhesive layer 2 is placed so as to face the surface of the decorative casing 1, and the film 3 is bonded to it under heat and pressure.

Next, as shown in FIG. 4(c), a laser beam 6 is applied to a designated region from above the multilayer film 3. When the laser-reactive substance is an epoxy-based photo-hardening resin, the laser to be applied is preferably a solid-state laser (YAG, ruby, etc.), and when it is an oxetane-based photo-hardening resin, a He—Cd laser is preferable. In the laser applied region 7, the optical characteristic of the laser-reactive substance changes. As shown in FIG. 4(d), when the application of the laser is stopped, the laser engraved mark remains in the laser applied region 7, because the change of the laser-reactive substance is irreversible. In this way, since the laser applied region 7 has a different optical characteristic than that of the other regions, a letter, symbol or the like can be formed.

In the decorative casing manufacturing method of the 13th embodiment, the multilayer film may be formed by laminating together a plurality of films having different refractive indexes. For example, by laminating a plurality of PET films having different refractive indexes, an interference color whose hue changes according to a viewing angle can be produced, and this, coupled with the special effect produced by the adhesive layer, can achieve an intricate decorative effect.

(14th Embodiment)

Figure 5:
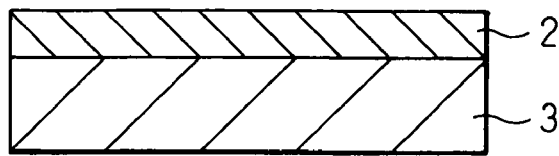
FIG. 5 is a process flow diagram illustrating a manufacturing method of a decorative casing according to a 14th embodiment of the present invention.
Figure 5:
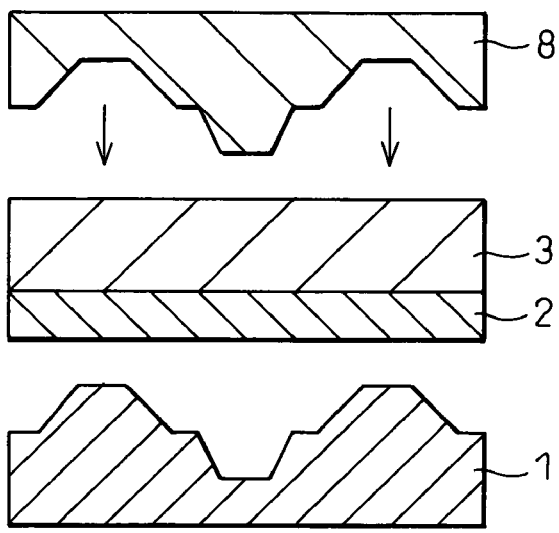
Figure 5:
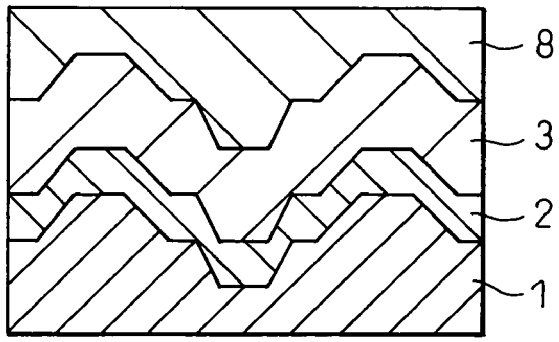
Figure 5:
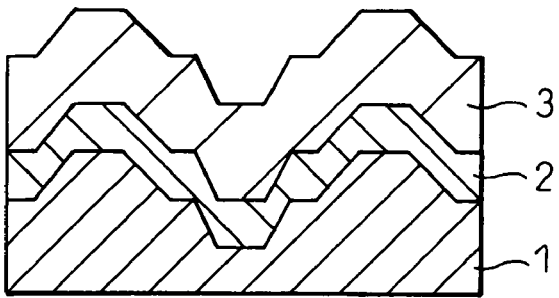

Next, another manufacturing method of the decorative casing according to the present invention will be described. FIG. 5 shows a process flow diagram illustrating the manufacturing method of the decorative casing according to the 14th embodiment. This embodiment is based on the structure of the decorative casing shown in FIG. 1, but concerns an example of the manufacturing method applied to the structure in which the surface of the decorative casing is formed with projections and depressions. This manufacturing method is characterized in that, in the film compression-bonding step, the multilayer film is heated and pressed by a pressing jig having a shape that matches the surface shape of the casing, and the multilayer film is thus bonded to the surface of the casing via the adhesive layer.

First, as shown in FIG. 5(a), the adhesive layer 2 is formed on the multilayer film 3 by a die coating method or the like.

Next, as shown in FIG. 5(b), the casing 1 with projections and depressions formed on its surface is placed so as to face the surface of the multilayer film 3 on which the adhesive layer 2 has been formed. Then, the pressing jig 8 is positioned above the multilayer film 3. The pressing jig 8 has a shape that mates with the surface shape of the casing 1.

Next, the pressing jig 8 is pressed onto the multilayer film 2, which is thus pressed and heated. As a result, as shown in FIG. 5(c), the multilayer film 3 with the adhesive layer formed thereon is firmly pressed onto the casing 1 so as to conform to the surface shape thereof. After heating and pressing for a predetermined period, the entire structure is cooled and the pressing jig 8 is removed; in this way, the multilayer film 3 is bonded via the adhesive layer 2 to the surface of the casing 1 formed with projections and depressions. Thus, the multilayer film 3 can be firmly bonded to the casing so as to conform to its surface shape even when projections and depressions are formed on its surface.

(15th Embodiment)

Figure 6:
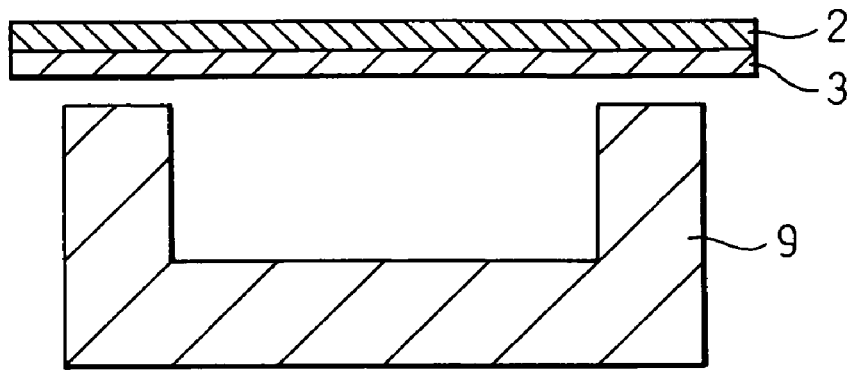
FIG. 6 is a process flow diagram illustrating a manufacturing method of a decorative casing according to a 15th embodiment of the present invention.
Figure 6:
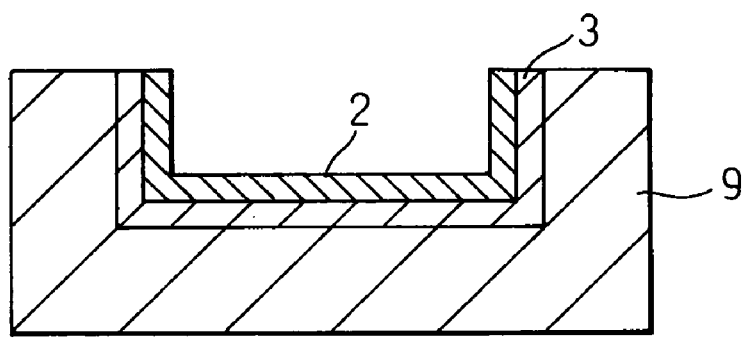
Figure 6:
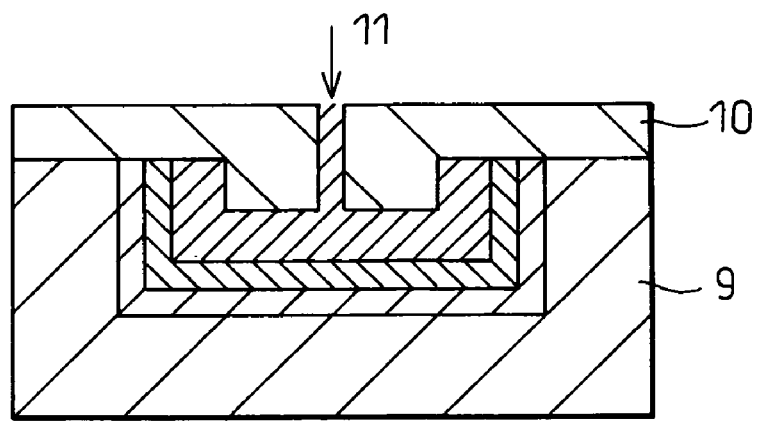
Figure 6:
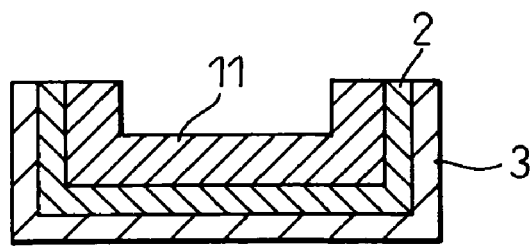

Next, another manufacturing method of the decorative casing according to the present invention will be described. FIG. 6 shows a process flow diagram illustrating the manufacturing method of the decorative casing according to the 15th embodiment. In the foregoing embodiments, the decorative casing has a planar shape as a whole. On the other hand, the present embodiment is applied to the case where the decorative casing has an outwardly protruding curved or spherically shaped surface and the multilayer film is bonded to the entire surface of the casing via the adhesive layer without causing creases. The manufacturing method is as follows. First, in the film compression-bonding step, the multilayer film with the adhesive layer formed thereon is placed on a mold having a recess of a prescribed shape, and the multilayer film is formed into the shape of the recess. Next, an injection molding die is placed on the mold by interposing the film therebetween, and a thermoplastic resin is injected into the recess formed by the multilayer film. The thermoplastic casing is thus formed according to this manufacturing method.

Next, the manufacturing method of the present embodiment will be described with reference to the drawings. First, as shown in FIG. 6(a), the multilayer film 3 with the adhesive layer 2 formed thereon is placed on the recessed side of the mold 9 having the recess of the prescribed shape. Next, as shown in FIG. 6(b), the multilayer film 3 placed on the mold 9 having the recess of the prescribed shape is formed into the shape of the recess. In this case, the multilayer film 3 can be formed into the shape of the recess by pressing it onto the recess or by evacuating air through an evacuation hole (not shown) provided in the mold 9.

Next, as shown in FIG. 6(c), the injection molding die 10 is placed on the mold 9 by interposing the multilayer film 3 therebetween, and a thermoplastic resin 11 is injected into the recess formed by the multilayer film 3. Then, as shown in FIG. 6(d), after the thermoplastic resin is cooled, the mold 9 and the injection molding die 10 are withdrawn, and unwanted portions of the thermoplastic resin are trimmed off. The fabrication of the casing 1 with the multilayer film 3 formed thereon via the adhesive layer 2 is thus completed.

By using this manufacturing method, the fabrication of the casing and the compression-bonding of the multilayer film can be simultaneously accomplished, which serves to reduce the number of process steps. The present embodiment has shown an example in which the mold has a planar surface. On the other hand, if a mold formed with projections and depressions is used, the multilayer film can be placed conforming to the projections and depressions, and the surface of the casing can be formed into the shape conforming to the shape of the mold without causing creases.

In the above decorative casing manufacturing method, a treatment for enhancing adhesion may be applied before forming the adhesive layer 2 on the multilayer film 3. In the adhesion enhancing treatment, the surface of the multilayer film on which the adhesive layer is to be formed is treated with corona or flame for enhanced adhesion. By thus treating the surface, a decorative casing having good adhesion to the multilayer film can be obtained.

Further, in the above decorative casing manufacturing method, a colorless, colored transparent or semi-transparent cover layer may be formed on the surface of the multilayer film. By forming such a cover layer, abrasion and corrosion resistant characteristics can be conferred on the multilayer film 3. When a colorless transparent layer is used, the original color hue can be maintained, while when a colored or semi-transparent layer is used, an additional hue can be provided.

(16th Embodiment)

Figure 7:
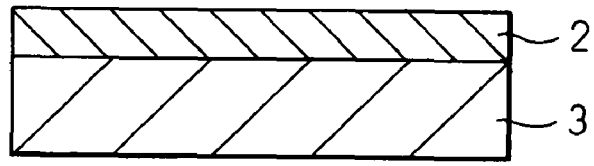
FIG. 7 is a process flow diagram illustrating a manufacturing method of a decorative casing according to a 16th embodiment of the present invention.
Figure 7:
Figure 7:
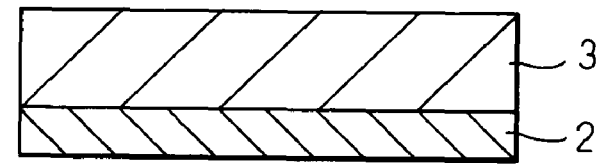
Figure 7:
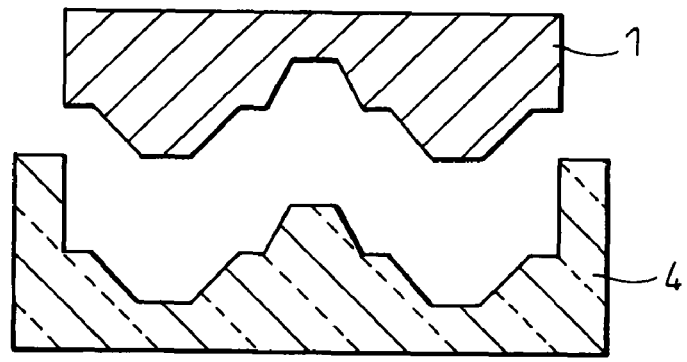
Figure 7:
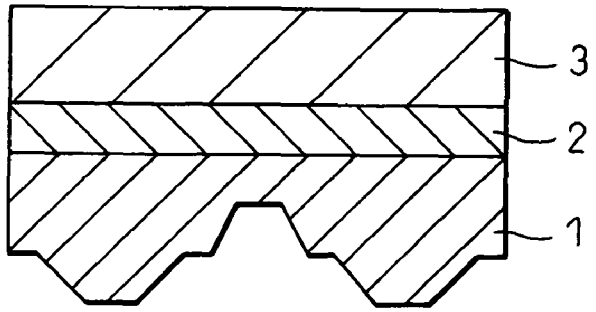
Figure 8:
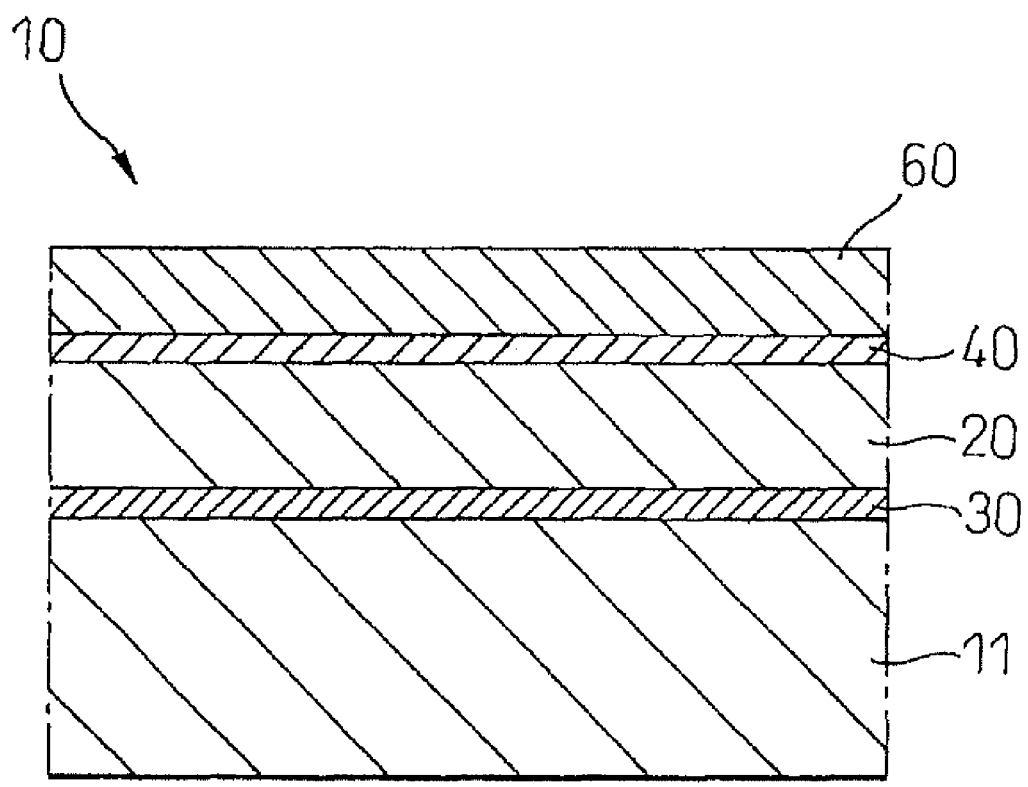
FIG. 8 is a cross-sectional view of an automotive film according to the prior art.

Next, the manufacturing method of the decorative casing according to the 16th embodiment of the present invention will be described. FIG. 7 shows a process flow diagram illustrating the manufacturing method of the decorative casing. This embodiment is applied to the case where the decorative casing has the structure shown in FIG. 2(b), and is characterized in that when, of the two surfaces of the casing, one surface is flat, but the other surface is formed with projections and depressions, the multilayer film is reliably bonded to the casing by using the adhesive layer.

First, as shown in FIG. 7(a), the adhesive containing a coloring agent and dissolved in an organic solvent is applied over the multilayer film 3 by using a method such as die coating. Next, the thus applied material is dried and the organic solvent removed, thus forming the adhesive layer 2. Next, as shown in FIG. 7(b), the casing 1 separately fabricated is placed with its flat surface facing the surface of the multilayer film 3 on which the adhesive layer 2 has been formed.

Then, a hot press mold 4 having an interior shape that mates with the projections and depressions formed on the other surface of the casing 1 is placed as shown. Next, the casing 1 and the multilayer film 3 are pressed together and forced onto the interior surface of the hot press mold 4 under heat by applying a pressure plate 5 from the side of the multilayer film 3 opposite the side on which the adhesive layer 2 is formed. The heat may be applied either by heating the hot press mold 4 or by heating the pressure plate 5. By applying the pressure while heating, the adhesive layer 2 is made to adhere to the casing 1. Next, as shown in FIG. 7(c), after the casing 1 is cooled, the hot press mold 4 and the pressure plate 5 are removed. The fabrication of the casing 1 with the multilayer film 3 bonded to the surface thereof is thus completed.

With this manufacturing method, even in the case of the casing with projections and depressions formed on the surface thereof opposite to the surface to which the multilayer film is bonded, the pressure can be applied evenly within the predefined plane, and the adhesive layer 2 can thus be bonded evenly over the entire surface of the casing in the multilayer film bonding step. As a result, the adhesive layer containing the coloring agent can be formed to a uniform thickness, and the special effects produced by the adhesive layer 2 can be equalized within the plane.

The above embodiments are illustrative only and are not intended to be limiting, and various modifications may be made without departing from the scope of the present invention.

What is claimed is:

1. A decorative casing having a film bonded to a surface of a casing body of said decorative casing via an adhesive layer, wherein said film is a transparent multilayer film comprising at least two kinds of thin films having different refractive indexes being formed one on top of another in hundreds of layers so as to produce an interference color whose hue changes according to a viewing angle and a special-effect material is added to said adhesive layer.

2. A decorative casing as claimed in claim 1, wherein said special-effect material is a paint.

3. A decorative casing as claimed in claim 2, wherein said paint is formed from either an acrylic-based pigment or an urethane-based pigment, or both.

4. A decorative casing as claimed in claim 2, wherein said special-effect material is a fluorescent paint.

5. A decorative casing as claimed in claim 2, wherein said special-effect material is a luminous paint.

6. A decorative casing as claimed in claim 2, wherein said special-effect material contains single or multiple color paints, and
a marble pattern is formed on the surface of said casing body.

7. A decorative casing as claimed in claim 1, wherein said special-effect material contains fine optical reflectors.

8. A decorative casing as claimed in claim 7, wherein said optical reflectors are formed from metal.

9. A decorative casing as claimed in claim 8, wherein said metal includes at least one substance selected from the group consisting of silver, aluminum, and stainless steel.

10. A decorative casing as claimed in claim 7, wherein said optical reflectors are formed from glass.

11. A decorative casing as claimed in claim 1, wherein said special-effect material contains fine carbon particles or carbon fiber.

12. A decorative casing as claimed in claim 1, wherein said special-effect material contains a laser-reactive substance that reacts to laser radiation.

13. A decorative casing as claimed in claim 12, wherein said laser-reactive substance is either an epoxy-based photo-hardening resin or an oxetane-based photo-hardening resin.

14. A decorative casing as claimed in claim 1, wherein said special-effect material contains a heat dissipating fine material having high thermal conductivity.

15. A decorative casing as claimed in claim 14, wherein said heat dissipating material contains metal particles or metal flakes.

16. A decorative casing as claimed in claim 15, wherein said heat dissipating material contains a structure formed from carbon.

17. A decorative casing as claimed in claim 1, wherein said special-effect material contains fine bubbles.

18. A decorative casing as claimed in claim 17, wherein said fine bubbles are formed by foaming azodicarbonamide.

19. A decorative casing as claimed in claim 1, wherein said special-effect material contains an elastic fine material.

20. A decorative casing as claimed in claim 1, wherein said adhesive layer has a selectively varying thickness with respect to the surface of said casing body.

21. A decorative casing as claimed in claim 1, wherein the surface of said casing body is formed with projections and depressions.

22. A decorative casing as claimed in claim 1, wherein said adhesive layer comprises at least two kinds of special-effect materials.

23. A decorative casing as claimed in claim 1, wherein the surface of said casing body to which said film is bonded is flat, and
a casing surface opposite from said surface of said casing body contains projections and depressions.

24. A decorative casing as claimed in claim 1, wherein said casing body is formed from a resin.

25. A decorative casing as claimed in claim 1, wherein said casing body is formed from metal.

26. A decorative casing as claimed in claim 23, wherein said metal includes at least one substance selected from the group consisting of stainless steel, aluminum, titanium, silver, magnesium, and an alloy thereof.

27. A decorative casing as claimed in claim 1, wherein said casing body is formed from glass.

28. A decorative casing as claimed in claim 1, wherein said casing body is formed from a structure made of carbon.

29. A decorative casing as claimed in claim 1, wherein said film is formed by laminating together a plurality of films having different refractive indexes.

30. A decorative casing as claimed in claim 1, wherein said special-effect material forms a decorative pattern, a letter, symbol or both on the surface of said casing body.

31. A decorative casing as claimed in claim 1, wherein a colorless, colored transparent or semi-transparent cover layer is formed on a surface of said film.

* * * * *